(12) United States Patent
Rijssenbeek et al.

(10) Patent No.: US 9,159,980 B2
(45) Date of Patent: Oct. 13, 2015

(54) ELECTROCHEMICAL CELL

(71) Applicant: General Electric Company, Schenectady, NY (US)

(72) Inventors: Job Thomas Rijssenbeek, Niskayuna, NY (US); Michael Alan Vallance, Niskayuna, NY (US); Charles Dominic Iacovangelo, Schenectady, NY (US); Jinghua Liu, Shanghai (CN); Roger Neil Bull, Burton Upon Trent (GB); Robert Christie Galloway, Burton Upon Trent (GB)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 13/727,666

(22) Filed: Dec. 27, 2012

(65) Prior Publication Data
US 2014/0186684 A1 Jul. 3, 2014

(51) Int. Cl.
*H01M 2/18* (2006.01)
*H01M 2/02* (2006.01)
*C23F 13/10* (2006.01)

(52) U.S. Cl.
CPC ............... *H01M 2/18* (2013.01); *C23F 13/10* (2013.01); *H01M 2/024* (2013.01); *C23F 2213/30* (2013.01)

(58) Field of Classification Search
CPC ......... H01M 2/18; H01M 2/024; C23F 13/10; C23F 2213/30
See application file for complete search history.

(56) References Cited

U.S. PATENT DOCUMENTS

| 2,641,622 | A | 6/1953 | Higgins et al. |
| 4,968,568 | A | 11/1990 | Higley |
| 4,981,757 | A | 1/1991 | Landers et al. |
| 6,329,099 | B1 | 12/2001 | Oyama et al. |
| 2003/0219649 | A1 | 11/2003 | Shoji et al. |
| 2009/0181307 | A1* | 7/2009 | Bito et al. .................. 429/229 |
| 2010/0178546 | A1 | 7/2010 | Rijssenbeek et al. |
| 2013/0004828 | A1 | 1/2013 | Zappi et al. |

FOREIGN PATENT DOCUMENTS

| CN | 1459878 A | 12/2003 |
| CN | 201829579 U | 5/2011 |
| EP | 421159 A1 | 4/1991 |
| GB | 1513685 A | 6/1978 |
| JP | 5242909 A | 9/1993 |
| JP | 2005071690 A | 3/2005 |
| WO | 9712410 A1 | 4/1997 |

OTHER PUBLICATIONS

Chinese Office Action issued in connection with corresponding CN Application No. 201110341544.0 on Jul. 3, 2014.
China Search Report for corresponding China Application No. 201110341544.0, mailed on Mar. 10, 2015—2 pages.

* cited by examiner

*Primary Examiner* — Raymond Alejandro
(74) *Attorney, Agent, or Firm* — Dority & Manning, P.A.

(57) ABSTRACT

An electrochemical cell is presented. The cell includes a housing formed of a metallic material. A component is disposed within an anode compartment of the cell that contains an alkali metal. The component comprises a sacrificial metal that has an oxidation potential less than the oxidation potential of the housing material. An energy storage device including such an electrochemical cell is also provided.

21 Claims, 7 Drawing Sheets

ELECTROCHEMICAL CELL

BACKGROUND

The invention relates generally to an electrochemical cell, and in some specific embodiments, to a high-temperature, rechargeable electrochemical cell, and related devices.

A battery is an essential component used to store a portion of the energy in mobile systems such as electric vehicles, hybrid electric vehicles and other types of vehicles and non-vehicles (for example, locomotives, off-highway mining vehicles, marine applications, buses and automobiles), and for stationary applications such as uninterruptible power supply (UPS) systems and "Telecom" (telecommunication systems). The high-temperature sodium-metal halide electrochemical cells are generally targeted for use in locomotives; telecommunication, and uninterruptible power supply (UPS) batteries. These cells could potentially offer high energy density, high power density, longer cell life, and lower cost-requirements for many of these applications.

Normally, a battery is made up of many cells. Current development of these batteries is focused on performance and cell life. A number of factors can affect performance, and limit the cell life. The primary factor may be unreliability of a separator. The most common separator used in these cells is beta"-alumina solid electrolyte (BASE), which is a sodium conducting ceramic.

It should be noted that thermal cycling, pressure differential, sodium-wicking, and vibrations in the cell, during use, may damage the separator in some circumstances. The damaged separator may lead to electrochemical corrosion of the casing (e.g. a steel casing), and a large thermal excursion in the cell. Usually, when the separator breaks, a metallic short is formed, allowing the battery to operate with the failed cell. However, in some cases, high temperature conditions, combined with the corroded cell casing, may allow the cell's chemical components to breach the casing, which can short-out the entire battery.

Development work has been undertaken on different battery designs to avoid and/or solve the corrosion problem. One way to avoid the corrosion of the cell is by providing effective thermal and electrical conductance between the core of the cell and the casing. However, there may be significant limitations in current designs to perform these functions effectively. Also, the currently available designs are not suitable to reduce or prevent the corrosion of the housing significantly.

It would therefore be desirable to develop a new cell design, with improved thermal management and improved reliability, for various battery applications.

BRIEF DESCRIPTION

Some embodiments of the present invention provide an electrochemical cell. The cell includes a housing comprising a metallic material. A component is disposed within an anode compartment of the cell that contains an alkali metal. The component comprises a sacrificial metal that has an oxidation potential less than the oxidation potential of the housing material.

According to some embodiments of the present invention, the cell comprises a tubular ion-conducting separator disposed in a volume defined by a housing. The housing comprises iron. An anode compartment of the cell contains an alkali metal. A shim structure is disposed within the anode compartment, generally parallel to an anode surface of the separator. The shim structure comprises zinc.

An energy storage device is provided in some embodiments of the present invention. The device usually includes a plurality of electrochemical cells that are in thermal and electrical communication with each other.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value.

In the following specification and claims, the singular forms "a", "an" and "the" include plural referents, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be".

As used herein, the term "anodic material" refers to a material that accepts electrons during charging, and is present as part of a redox reaction. The term "cathodic material" refers to a material that supplies electrons during charging, and is also present as part of the redox reaction. The cathodic material is present as a participating electrochemical reactant, either in its oxidized or reduced state, or at some state between full oxidation and reduction. An electrolyte, as used herein, is a medium that provides the ion transport mechanism between the positive and negative electrodes of a cell, and may act as a solvent for the oxidized form of the electrode material. Additives that facilitate the ion transport mechanism, but do not themselves provide the mechanism, are distinguished from the electrolyte itself.

As used herein, the term "high temperature" generally refers to temperatures above about 250 degrees Celsius (° C.), unless otherwise indicated.

Figure 1:
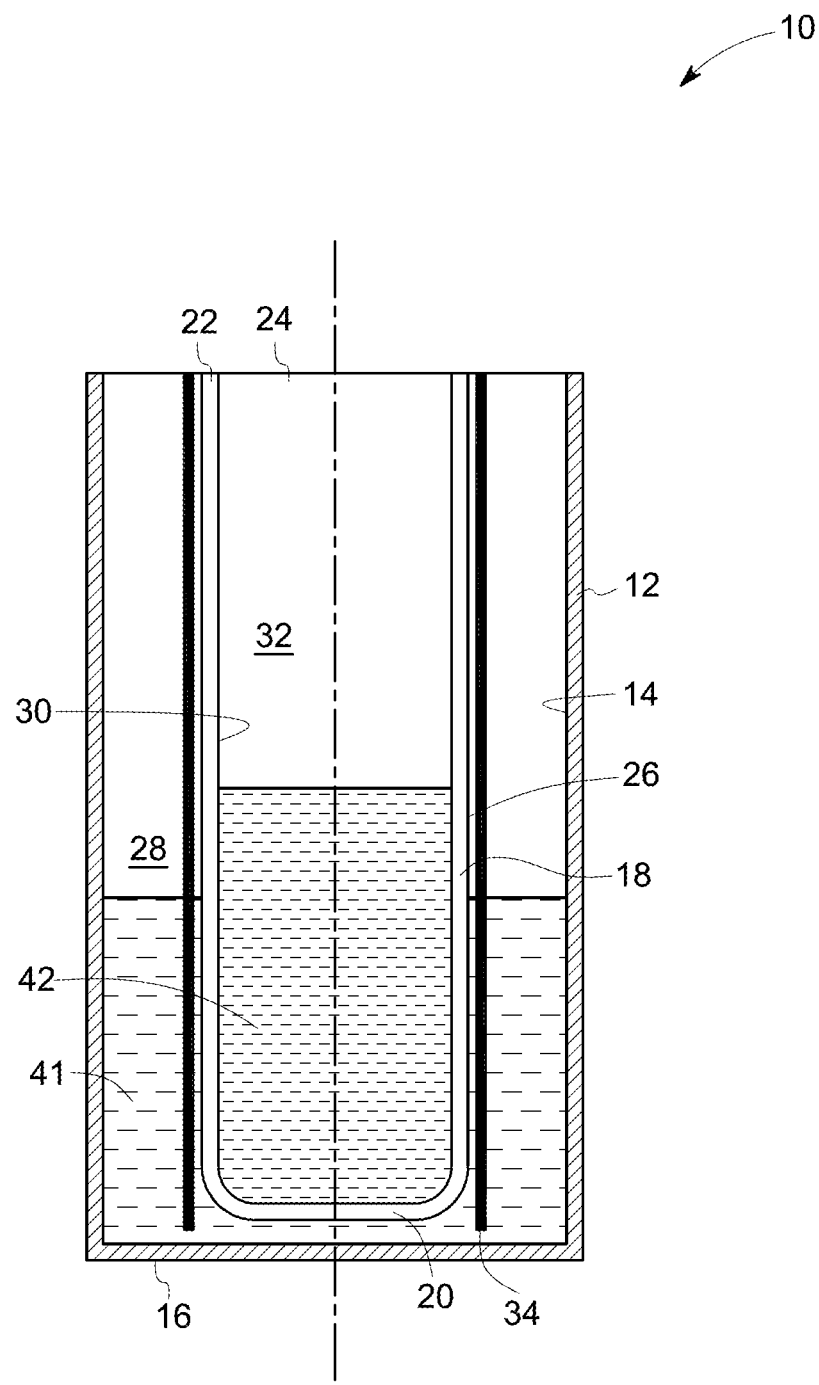
FIG. 1 is a schematic of an electrochemical cell according to an embodiment of the present invention.

FIG. 1 illustrates a schematic of an electrochemical cell 10, according to one embodiment of the invention. The electrochemical cell 10 includes a housing 12 having an interior surface 14 that defines a volume; and has a base 16. The housing 12 may also be referred to as a "casing." In one embodiment, the housing 12 may have a circular or elliptical cross-section. In another embodiment, the housing 12 may be polygonal in cross-section, and may have a plurality of corner regions. In such instances, the housing 12 of the electrochemical cell 10 may be square in cross-section, and have four corner regions. With regard to the material, the housing 12 is generally made of a metallic material. Suitable metallic materials may include nickel, iron, or molybdenum. Specific examples may be mild steel, stainless steel, nickel-coated steel, and molybdenum-coated steel.

The electrochemical cell 10 includes a separator 18 disposed in the volume of the housing 12. The separator 18 is usually an ion-conducting solid electrolyte. Suitable materials for the separators may include beta'-alumina, beta"-alumina, beta'-gallate, beta"-gallate, or zeolite. In specific embodiments, the separator 18 includes a beta"-alumina solid electrolyte (BASE).

The separator 18 may be characterized by a selected ionic conductivity. The resistance of the separator 18 (i.e., across its thickness) may depend in part on the thickness of the separator wall itself. A suitable thickness can be less than about 5 millimeters. In one embodiment, the thickness of the separator wall may be in a range from about 0.5 millimeter to about 5 millimeters. In certain embodiments, the thickness may range from about 1 millimeter to about 2 millimeters.

In the illustrated embodiment, the separator 18 may be cylindrical, elongate, tubular, or cup-shaped, with a closed-end 20 and an open-end 22 for a cylindrical or tubular cell. In one embodiment, the separator may be substantially planar; and the corresponding cell may be a planar electrochemical cell. Referring to FIG. 1 again, the open-end 22 of the separator 18 may be sealable, and may be a part of the separator assembly that defines an aperture 24 for filling the separator 18 with a material during the manufacturing process. In one instance, the aperture 24 may be useful for adding the cathodic material. The closed-end 20 of the separator 18 may be pre-sealed, to increase the cell integrity and robustness.

The separator 18 may have a cross-sectional profile that may be a circle, an oval or ellipse, a polygon, a cross-shape, or a star shape, for example. In some particular embodiments, the separator 18 may have a cross sectional profile in the shape of a rugate (described in the embodiments below). Such a shape usually includes a plurality of lobe portions and valley (depression) portions (also referred to as "lobes" and "valleys"), in an alternating pattern. A pair of lobe portions may define the valley portion. The rugate, which may provide a cloverleaf shape, may increase the overall, available surface area of the separator 18, for a given volume. The separator 18 may be concentrically located in the housing 12. It is possible to have the number of lobe portions of the separator correspond in number to the plurality of the peripherally spaced corners of the housing 12.

With continued reference to FIG. 1, the housing 12 is generally a container that defines an anode compartment 28 between the interior surface 14 of the housing 12, and an anode surface 26 of the separator 18. The separator 18 further has a cathode surface 30 that defines a portion of a cathode compartment 32. The cathode compartment 32 is disposed within the anode compartment 28, in these instances. Moreover, the anode compartment 28 is in ionic communication with the cathode compartment 32, through the ion-conducting separator 18. The anode compartment 28 and the cathode compartment 32 further include current collectors (not shown), to collect the current produced by the electrochemical cell. Optionally, the housing 12 (or casing) may serve as the anode current collector.

In one embodiment, the anode compartment 28 contains an anodic material 41; and the cathode compartment 32 contains a cathodic material 42. Typically, the anodic material 41 includes an alkali metal. An alkali metal ion is transported across the separator 18, between the anode compartment 28 and the cathode compartment 32. The anode compartment 28 may receive and store a reservoir of the anodic material 41. Non-limiting examples of the anodic material may include lithium, sodium, or potassium. The anodic material 41 is usually molten during use. In one embodiment, the anodic material 41 is sodium.

In some embodiments, the anodic material 41 may include one or more additives. One example is a metal oxygen scavenger. Examples of the metal oxygen scavengers may include one or more of manganese, vanadium, zirconium, aluminum, nickel, tantalum, or titanium. Other useful additives may include materials, e.g. sodium amide, that increase wetting of the separator surface by the molten anodic material. The amount of additives present is usually no greater than about 1 volume percent (for each additive).

The cathodic material 42 may exist in elemental form, or as a salt, depending on the state of charge for a particular electrochemical device (i.e., in regard to the ratio of the forms of material which are present). The cathodic material may contain a metal, and the salt-form of the cathodic material may be a halide. Suitable metals for use as the cathodic material may include aluminum, nickel, zinc, copper, chromium, tin, arsenic, tungsten, molybdenum, iron, and various combinations thereof. The halide of the metal may be chlorine, fluorine, bromine, iodine, or various combinations thereof.

The cathodic material 42 can be self-supporting or liquid/molten. In one embodiment, the cathodic material is disposed on an electronically conductive support structure. The support structure does not undergo any chemical reaction during the charge/discharge, but does support the cathodic material during chemical reactions. The support structure can be in a number of forms, such as a foam, a mesh, a weave, a felt, or a plurality of packed particles, fibers, or whiskers. In one embodiment, a suitable support structure may be formed from carbon. An exemplary carbon form is reticulated foam. The support structure may also be formed from a metal. The cathodic material can be secured to an outer surface of the support structure. In some instances, the support structure can have a relatively high surface area, e.g., at least about 0.3 square meters per cubic centimeter.

A sulfur or a phosphorous-containing additive may be disposed in the cathodic material. For example, elemental sulfur, sodium sulfide or triphenyl sulfide may be disposed in the cathode. The presence of these additives in the cathode may reduce or prevent recrystallization of salts, and grain growth.

The cathode compartment 32 usually includes a molten electrolyte (not shown), generally infused with the cathodic material 42. The molten electrolyte transports the ions from the solid separator 18 to the cathodic material, and vice-versa. In one embodiment, the molten electrolyte includes a binary electrolyte including an alkali metal halide and aluminum halide. The alkali metal halide includes the alkali metal used as the anodic material (discussed above) in the cell 10. In a specific embodiment, the molten electrolyte is sodium tetrachloroaluminate ($NaAlCl_4$). In some embodiments, the molten electrolyte may include an additional metal halide, and forms a ternary or quaternary electrolyte.

The melting point of the molten electrolyte and the temperature-dependent, ion-conductivity of the solid separator are primary factors in determining the minimum operating temperature of the cell. The melting point of the molten electrolyte $NaAlCl_4$ may be about 150 degrees Celsius. In some instances, optimum performance of the cell is generally obtained at a temperature greater than about 250 degrees Celsius. In one embodiment, the operating temperature may be in a range from about 270 degrees Celsius to about 350 degrees Celsius.

In some embodiments (though not all embodiments), the anode compartment 28 may further include one or more shim-structures 34 disposed adjacent to the anode surface 26 of the separator 18, as illustrated in FIG. 1. A single shim-structure, or multiple shim-structures, may generally wrap around the separator 18. A shim-structure may contain a single shim or multiple shims, as described in Patent Application Publication No. U.S. 2010/0178546 A1, filed on 9 Jan. 2009; and patent application Ser. No. 13/173,320, filed on 30 Jun. 2011, which are incorporated herein by reference.

As used herein, the term "shim" refers to a thin piece of a material, used to fill gaps, make something level, support something, or adjust something to fit properly. In particular, the term "shim" often refers to a cladding used to cover a surface of the separator. A suitable shim for the shim-structure may be formed from a metal sheet, a metal foil, or the like. Each shim may have a thickness that is usually in a range of from about 0.01 millimeter to about 1 millimeter. The multiple shims may be arranged with their elongated surfaces, generally (but not always) parallel to one-another. The shims may fully overlap one another. A shim-structure having two shims arranged in such a way, may also be referred to as a "double shim-structure." As used herein, the term "shim-structure" may be used to denote both a single shim-structure as well as a multiple shim-structure.

These shim-structure/structures 34 can perform several functions, such as providing a structure for electrical and thermal conduction within the cell, and providing enhanced transport and utilization of the anodic material 41. In some specific embodiments, the shim structure 34 collects the current in the anode compartment, functioning as a current collector.

The material for shims may be selected such that it may be thermally and electrically conductive, and at the same time may be chemically and electrochemically inert in the anode environment. The material may include a single metal, a metal-containing composite, or an alloy. In one embodiment, the shims may include a metal or a non-metal substrate covered with a metal layer on one or both sides. Typically, the shims include iron, nickel, aluminum or an alloy thereof. Furthermore, each shim of the shim-structure may be formed of a same material or different materials.

In one embodiment, the separator 18 (e.g., in FIG. 1) has a selected length (or height) and the shim-structure 34 may extend to the full length of the separator 18. In other embodiments, the shim-structure 34 may extend to only a portion of the length of the separator 18. In one embodiment, each shim may have uniform thickness throughout the shim. In another embodiment, the thickness of the shim may grade through the height of the shim. In particular, the shim may sometimes be relatively thick at an edge near the bottom of the cell, and thinner at the opposite edge, at top of the cell.

The shim-structure 34 may be mounted in close proximity to the anode surface 26 of the separator 18. Furthermore, the shim-structure 34 may be shaped to conform to all or a part of the anode surface of the separator. In one embodiment, the shim-structure 34 may be further shaped so that one or more locations of the structure are in contact with the housing. The shim-structure 34 is usually designed in a manner that renders the shims flexible enough to allow the deposition and transport of metallic anodic material (e.g., sodium) between the shim-structure 34 and the anode surface 26 of the separator. In one embodiment, multiple shim-structures may be combined to cover most of the surface of the separator from which an ionic current may be collected. Fewer individual shim structures are preferred in some instances, because of increased simplicity and lower cost. If there is more than one shim structure, the structures may be interlocking or partially overlapping. In one embodiment, the shim-structure may be physically connected to the housing, or may form part of the housing. Further connections or contacts may be made between the structure and battery housing, using other pieces which may or may not be of the same material or shape.

Typically, multiple electrochemical cells are stacked adjacent to each other in an energy storage device (e.g. a battery pack), depending on the output requirement of the energy storage device, and on the end use application. The cells are electrically connected to each other in series and/or in parallel arrangements. Sometimes, the battery pack or battery may fail due to the damage to a single cell.

One failure mechanism may be initiated when the solid separator cracks, or otherwise becomes damaged. When the solid separator is breached, the molten electrolyte (from the cathode compartment) may come into contact with the anodic material (for example, sodium), resulting in electronic shorting. The battery still may continue to operate, and to continue cycling with a shorted cell (or failed cell). During the operation of the battery, the excess electrolyte, over time, may come into contact with the housing (or casing) of the cell, and can form a new electrochemical cell (i.e. a galvanic cell). This galvanic cell involves reduction and oxidation of iron (from the cell housing) and the cathodic material, and can lead to electrochemical corrosion of the housing. For this reason, the molten electrolyte may also be referred to as "corrosion material."

As used herein, "corrosion" is a chemical reaction occurring by an electrochemical mechanism. During corrosion, two reactions occur: (i) oxidation, where electrons leave a metal, resulting in the conversion of the metal to a metal salt; and (ii) reduction, where the electrons are used to convert the metal salt to metal. For example, in the case of some of the electrochemical cells currently in use, as corrosion takes place, the oxidation and reduction reactions occur; and ferrous chloride forms on the surface of the casing metal (e.g., steel), so that some regions of the casing metal becomes thinned and even breached.

In a cell, the anodic material (e.g., sodium) typically balances the cathodic material (e.g., nickel chloride). As discussed previously, the oxidized anodic material conducts through the separator, to communicate between the anode compartment and the cathode compartment, during charging and discharging. It may be possible sometimes, that in case of breaching, no corrosion occurs, if the anodic material is available in a sufficient amount to react with the material leaked from the cathode compartment. For example, the molten sodium may react with tetrachloroaluminate to form sodium chloride and aluminum, which acts as an "electronic short".

However, those skilled in the art may recognize that, sometimes, when the separator cracks or damages, the anodic material may not be available to react with the material of the cathode compartment. The reasons may include a small amount of the anodic material present in the discharge state of the cell, and/or sedimentation of the anodic material at the bottom of the container. Additionally, in such cases, the cell resistance of the shorted cell may be very high, which results in resistive heating, especially at the state of discharge. The corrosive material which leaks from the cathode compartment into the anode compartment, combined with the high temperature, may cause breaching of the housing. The corrosive material may attack the adjacent cells in the battery pack, which may ultimately lead to failure of the entire battery pack.

The embodiments of the invention described herein address the noted shortcomings of the state of the art. With continuing reference to FIG. 1, the anode compartment 28 may sometimes include a component that comprises a sacrificial metal. As used herein, the term "sacrificial metal" refers to a metal or a metal alloy that has a more "active" voltage, i.e. a more negative oxidation potential, than the metallic material of the housing 12 (such as the iron present in steel) in the electrochemical cell, and acts as a galvanic anode. In one embodiment, the oxidation potential of the sacrificial metal is less than the oxidation potential of iron. The difference in oxidation potentials of the two metals (the sacrificial metal and iron) in the cell, means that the sacrificial metal (present in the component) corrodes, and the component metal is consumed in preference to the housing metal. This effectively stops or inhibits the oxidation reaction on the housing surface, by transferring it to the component, which will be sacrificed in favor of the housing 12 under protection.

In one embodiment, the sacrificial metal is one that is electrically and thermally conductive. The sacrificial metal may be a single metal, or an alloy. Non-limiting examples of sacrificial metals are manganese, titanium, magnesium, zinc, copper, aluminum, chromium, or various combinations thereof. In normal operation of the cell, the sacrificial metal does not conduct through the ion-conducting solid separator, and does not participate in the cell reaction. Advantageously, the sacrificial metal is usually available to react with the cathodic material in case of breaching.

As used in this disclosure, the term "sacrificial metal" is not meant to include an alkali metal such as lithium, sodium, or potassium, which are typically used as the anodic material. Although these alkali metals may have an oxidation potential less than the oxidation potential of iron (or of the housing material), the "sacrificial metal" in this disclosure refers to an additional metal in the anodic material within the anode compartment, excluding the alkali metals.

In some specific embodiments, the component containing the sacrificial metal is formed of zinc, or a zinc-containing alloy. In some other specific embodiments, the component containing the sacrificial metal is formed of copper, or a copper-containing alloy. As per corrosion protection requirement, the component may be formed of pure copper or a high content of copper-alloy, depending in part on the material that forms the housing.

In some embodiments, the component is formed of brass. Typically, brass is an alloy of copper and zinc. Brass having high copper content may sometimes be desirable, because of high electrical and thermal conductivity requirements. In one embodiment, the amount of copper in brass may range from about 30% to about 70%, and more specifically, to about 60%. Furthermore, brass, as used herein, does not contain lead.

In some embodiments, the component may be partially or entirely covered by a coating comprising the sacrificial metal. For the purpose of simplifying the description, a "component comprising a sacrificial metal" is meant to include the situation in which the component is covered with a coating of the sacrificial material. In these embodiments, the component may not include the sacrificial metal, and may include another metal or a non-metal (e.g., a ceramic) covered with the sacrificial metal layer on one or all sides. Examples of some suitable metals may include iron, nickel, aluminum, or an alloy containing the foregoing. In some embodiments, the component may be formed of one sacrificial metal with a coating of another (different) sacrificial metal. One particular example would be a component formed of copper, coated with zinc.

The component containing the sacrificial metal may also contribute to thermal management of an electrochemical cell, under either operating or failed conditions. An electrochemical cell usually operates in a temperature range of from about 250 to about 380 degrees Celsius. In certain embodiments, the operating temperature of the cell may reach up to about 400 degrees Celsius. The component may provide effective thermal management in the cell, by reducing the rate of increase of temperature inside the cell, and conducting heat from the core of the cell towards the housing, in both operating and failed conditions.

The component in the anode compartment may be present in a variety of shapes, e.g., sphere, cube, rod, strip, plate, shim, or the like. Any other regular or irregular shaped component may also be possible. In one specific embodiment, the component is a rod or a strip. The rod may have a circular shape, an oval or ellipsoidal shape, or a polygonal cross-sectional profile. In another specific embodiment, the component containing the sacrificial material is a shim or a shim-structure, as described above. It may also be possible to use a number of components, and/or any combination of the components of different shapes, depending on the amount of the sacrificial metal desired inside the anode compartment, to be sacrificed in a failed cell.

According to some embodiments of the invention, as exemplified in FIG. 1, the shim-structure 34 includes the sacrificial metal, in addition to other materials, e.g., other metals. In some specific embodiments, the shim-structure 34 is formed entirely of the sacrificial metal. In the case of multiple shim structures, at least one shim and/or shim structure may be formed of the sacrificial metal. In some other embodiments, at least one shim of the shim-structure 34 may include a non-metal substrate covered with the sacrificial metal layer, on one or both sides.

Figure 2:
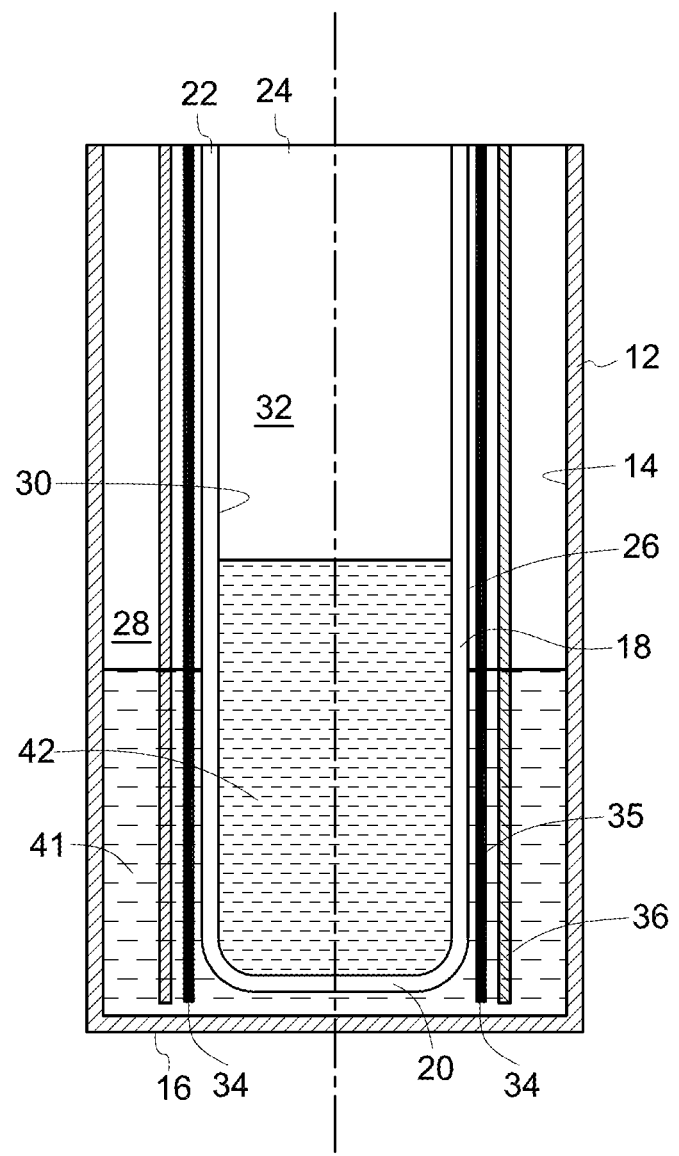
FIG. 2 is a schematic of an electrochemical cell according to another embodiment of the present invention.
Figure 3:
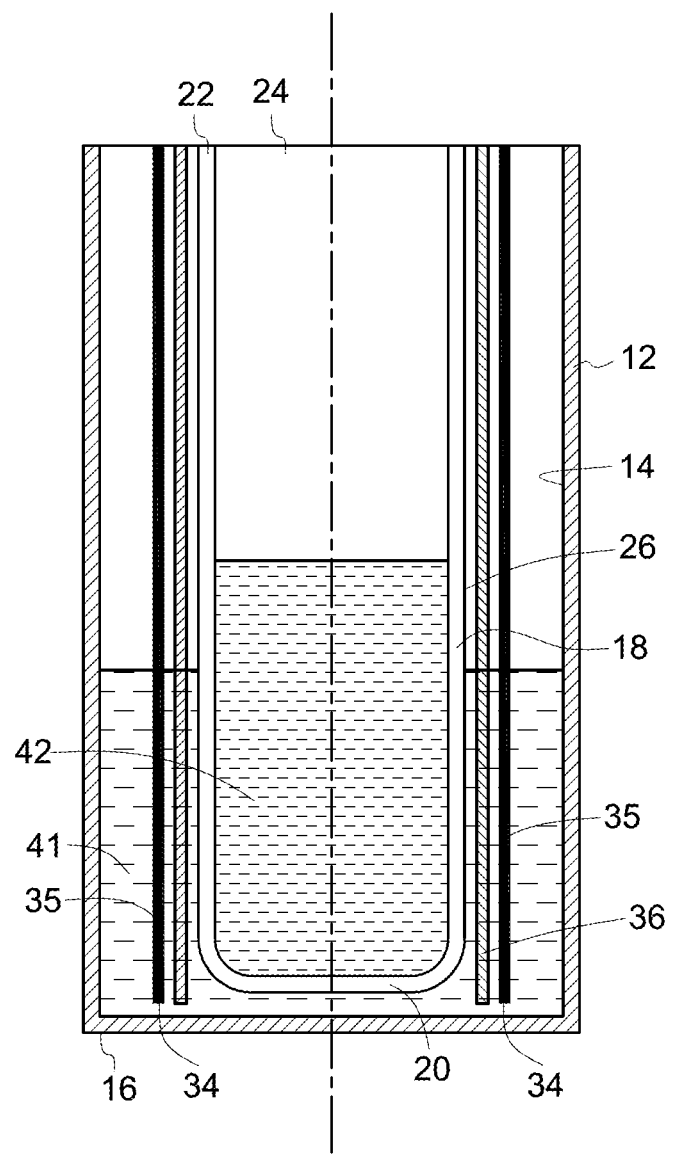
FIG. 3 is a schematic of an electrochemical cell according to yet another embodiment of the present invention.

In some embodiments, where the shim-structure 34 does not include the sacrificial metal, an additional shim-structure 36, formed of a sacrificial metal, or at least including an amount of the sacrificial material, may be disposed within the anode compartment 28. As depicted in FIGS. 2 and 3, respectively, the additional shim-structure 36 may be placed adjacent to an outer surface 35 of the shim-structure 34, or disposed between the shim-structure 34 and the anode surface 26 of the separator.

In some instances, the additional shim-structure 36 may be symmetrical, and identical (or similar) in shape, size, and type, to the shim-structure 34. However, they do not have to be identical or similar to each other, in other embodiments. As used herein, the term "type" refers to the configuration of a shim-structure with respect to the number of shims included in the shim-structure, and/or the number of shim-structures wrapped around the separator 18. A single shim-structure or multiple shim-structures 36 may be disposed, which may include a single shim or multiple shims (e.g., a double shim). Furthermore, each shim of the shim-structure 36 may be formed of a same material, or from different materials.

Figure 4:
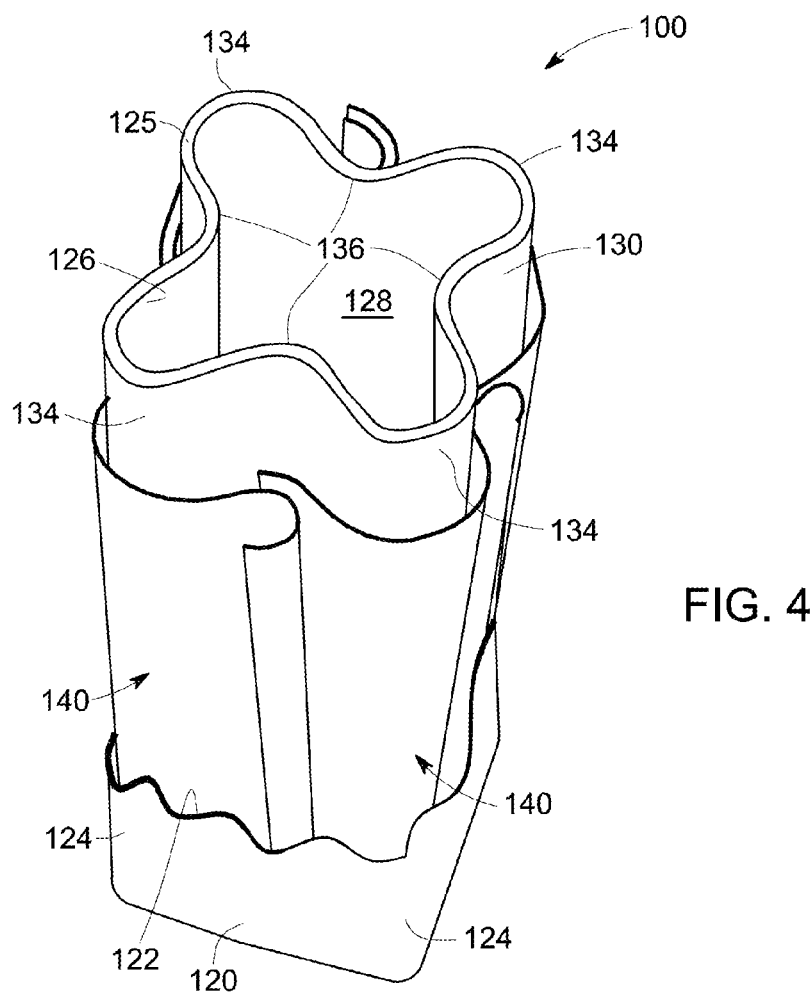
FIG. 4 is a schematic, three-dimensional view of an electrochemical cell, according to an embodiment of the invention.
Figure 5:
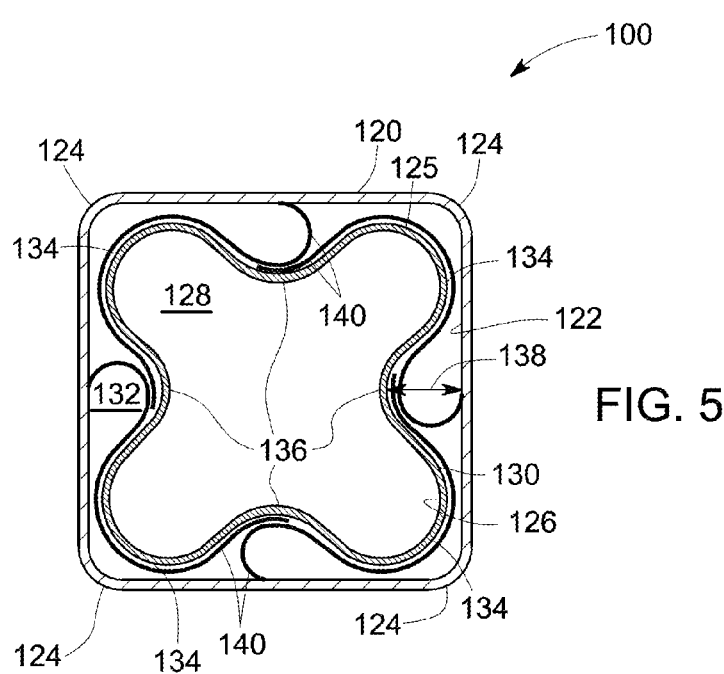
FIG. 5 is a cross-sectional, top view of an electrochemical cell, according to an embodiment of the invention.

FIGS. 4 and 5 illustrate a portion of an electrochemical cell 100 in accordance with another exemplary embodiment of the invention. The electrochemical cell 100 includes a housing 120, having an interior surface 122, defining a volume. For the purpose of illustration, the housing is only partially shown in FIG. 4, in terms of its height. The housing 120 can extend up to the full height of a separator 125, and usually does so. In the illustrated embodiment, the housing 120 has four corner regions 124, as more clearly depicted in FIG. 5. The separator 125 is disposed within the volume of the housing 122. The separator 125 may have an anode surface 126 that defines a portion of an anode compartment 128 (see FIG. 5). The separator 125 may further include a cathode surface 130 that defines a cathode compartment 132. The anode surface 126 and the cathode surface 130 are usually circumferential. The cathode compartment 132 is usually disposed within the anode compartment 128, as shown in FIG. 5. The anode compartment 128 is in ionic communication with the cathode compartment 132, through the separator 125.

With continuing reference to FIGS. 4 and 5, the separator 125 can be designed to have four lobe portions (lobes) 134, and four corresponding "valley" portions 136. A pair of lobes may define the valley portion that spans a gap 138 between an interior surface 122 of the housing 120, and the anode surface 126 of the separator 125. The separator 125 may be concentrically located in the housing 120, with each lobe 134 of the separator 125 being aligned with, and projecting towards, one of the corner regions 124 of the housing 120.

FIG. 4 further illustrates four shim structures 140 disposed adjacent the anode surface 126 of the separator, in some embodiments. However, in some other embodiments, a greater or lesser number of shim-structures may be wrapped around the separator 125, as described in referenced patent application Ser. No. 13/173,320. Each shim-structure 140 may engage one lobe portion 134, and at least a portion of the valley portion 136 of the separator 125. The arrangement of the shim-structures 140 around the separator 125, may be shown more clearly from a cross sectional profile of the electrochemical cell 100 (corresponding to FIG. 4), displayed in FIG. 5. In one embodiment, at least one shim-structure 140 is formed of the sacrificial metal. In a particular embodiment, the four shim-structures 140 are all formed of the sacrificial metal.

The shim-structures described in these exemplary embodiments, have substantially similar shapes, sizes and arrangements, as described in referenced Patent Application Publication No. U.S. 2010/0178546 A1 and patent application Ser. No. 13/173,320. Moreover, the shim-structures or individual shims may be textured, grooved, and/or perforated. As alluded to previously, the shims may have a uniform thickness, or may have a graded thickness, along the height of the shim.

Figure 6:
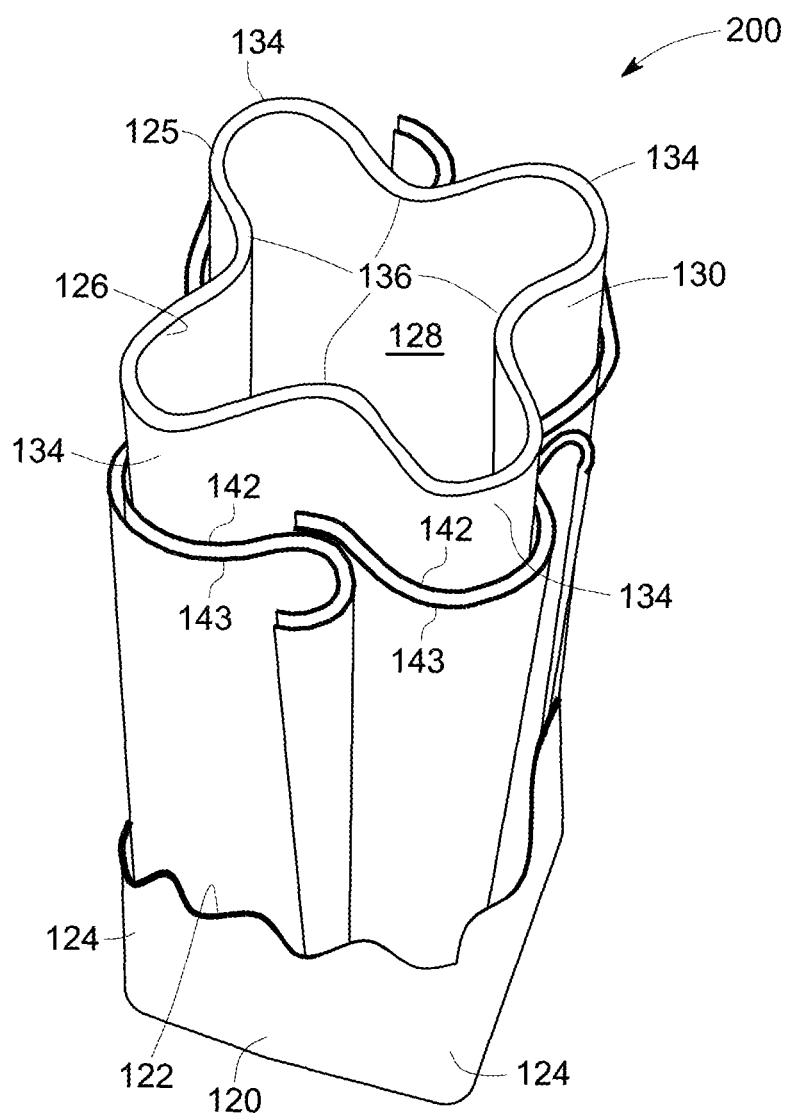
FIG. 6 is perspective, three dimensional view of an electrochemical cell, according to an embodiment of the invention.
Figure 7:
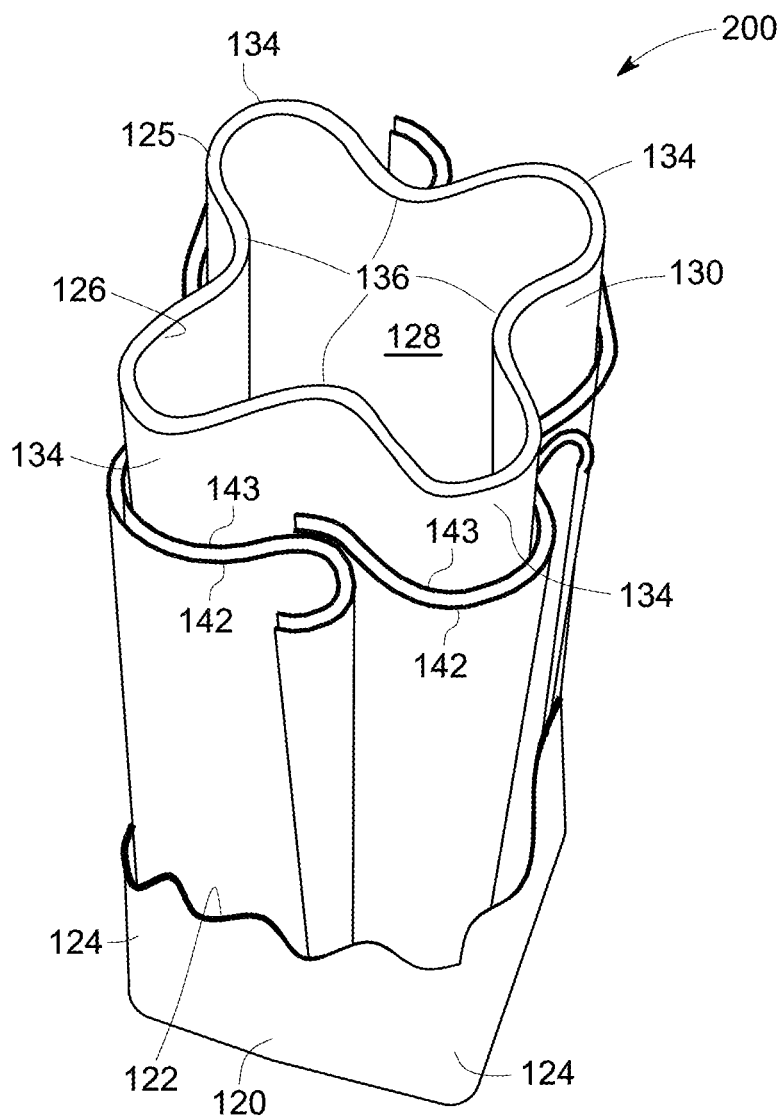
FIG. 7 is perspective, three dimensional view of an electrochemical cell, according to an embodiment of the invention.

Some alternative embodiments are depicted in FIGS. 6 and 7. Two sets of four shim-structures—a first set 142 and a second set 143 are arranged around the separator 125 within the anode compartment 128 of an electrochemical cell 200. The first set 142 is the conventionally used shim-structure, formed of a metal or metal alloy (e.g., nickel coated steel) as described previously, and the second set 143 includes the sacrificial metal. In these embodiments, the first set 142 and the second set 143 are symmetrical, and identical in shape and size, and may fully overlap each other. FIG. 6 illustrates the embodiment, in which the first set 142 of shims is disposed adjacent to the anode surface 126 of the separator, and the second set 143 of shims is disposed symmetrically adjacent to an outer surface 141 of the first set 142. In FIG. 7, the second set 143 of shims is disposed adjacent to the anode surface 126 of the separator, interposed between the separator 125 and the first set 142. In one embodiment, there is substantially no gap between the two sets 142 and 143. In another embodiment, the two sets of shim-structures 142 and 143 may have a gap 144. The gap 144 may be kept as small as possible, although for clarity it is shown, exaggerated, in FIGS. 6 and 7.

In accordance with other embodiments of the invention, an energy storage device includes a plurality of the electrochemical cells as disclosed in previous embodiments. The cells are, directly or indirectly, in thermal and/or electrical communication with each other. Those of ordinary skill in the art are familiar with the general principles of such devices.

EXAMPLES

The example that follows is merely illustrative, and should not be construed to be any sort of limitation on the scope of the claimed invention.

4 single-shim structures were manufactured from 4.8 cm×19.8 cm×0.1 mm steel sheets. The steel sheets were coated with nickel on both sides. The thickness of the coating was about 2 microns. The sheets were designed in a particular shape (as described in some of the above exemplary embodiments, and shown in FIG. 3), by stamping.

4 single shim-structures were manufactured from brass sheets. The shim-structures were constructed of the same shape and size, as described above for steel shims.

2 sodium-nickel-chloride cells; cell 1 and cell 2, were used for measuring the temperature profile within the cells, using steel shim structures and brass shim-structures, respectively. The cells used a tubular beta"-alumina separator (also referred to as BASE), and had the same design as described for FIGS. 4 and 5. The separators had about 23 cm length. Cathodic materials including nickel and sodium chloride were loaded into the tubular separators of both the cells, which act as the working cathodes. A quantity of sodium tetrachloroaluminate was further added to the cathodic material in each cell. Four steel shim-structures; and four brass shim-structures, were assembled in close proximity to the separator within the cell 1 and cell 2, respectively. The four shim-structures were wrapped around the separator by arranging one shim-structure per lobe of the separator. The cathode/separator/shim-structure assemblies were placed in a stainless steel casing containing 1-2 grams of metallic sodium. The casing size was about 35 cm×35 cm×0.4 mm. Temperature profiles of the cells were measured, using multiple thermocouples.

Figure 8:
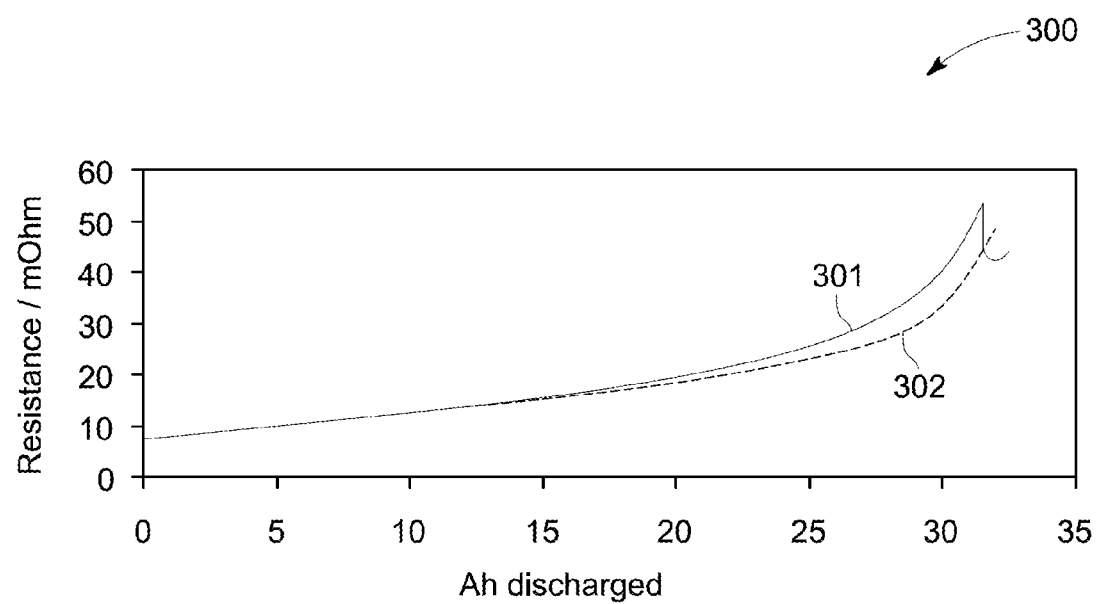
FIG. 8 is graph showing discharge curves of electrochemical cells, according to an exemplary embodiment of the invention.

FIG. 8 is graph 300 showing discharge curves 301 and 302 for cell 1 and cell 2, respectively. It is clear from the graph that the brass shim-structures shows substantially similar performance (discharge resistance) as nickel coated steel shim-structures. However, it had been observed that when the BASEs of both cells are deliberately cracked, brass shim-structures corroded more than nickel coated steel shim-structures, and corrosion of steel casing was observed only in the cell with nickel coated steel shim-structures.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical cell, comprising:
   a housing comprising a metallic material, wherein the housing defines a portion of an anode compartment containing an alkali metal, wherein the alkali metal is selected from the group consisting of lithium, sodium, and potassium;
   a separator disposed in the housing, and the anode compartment is disposed between the housing and an anode surface of the separator; and
   a component disposed within the anode compartment adjacent to the anode surface of the separator, wherein the component comprises a sacrificial metal having an oxidation potential less than the oxidation potential of the housing material, wherein the sacrificial metal comprises a metal or a metal alloy comprising manganese, titanium, magnesium, copper, or zinc, wherein the component comprising the sacrificial metal comprises a shim-structure, the shim structure being a separate structure from the anode surface of the separator.

2. The electrochemical cell of claim 1, wherein the housing is circular, elliptical, or polygonal in cross section.

3. The electrochemical cell of claim 1, wherein the metallic material of the housing comprises iron, nickel, molybdenum, or an alloy thereof.

4. The electrochemical cell of claim 1, wherein the alkali metal is sodium.

5. The electrochemical cell of claim 1, wherein the separator is cylindrical, elongated, tubular, or cup-shaped.

6. The electrochemical cell of claim 5, wherein the separator has a cross-sectional profile that is a circle, an oval or ellipse, a polygon, a cross-shape, a star-shape, or a cloverleaf shape.

7. The electrochemical cell of claim 1, wherein the separator comprises an alkali metal ion-conducting material.

8. The electrochemical cell of claim 1, wherein the separator further includes a cathode surface defining a cathode compartment that is in ionic communication with the anode compartment through the separator.

9. The electrochemical cell of claim 8, wherein the cathode compartment is disposed within the anode compartment.

10. The electrochemical cell of claim 1, wherein the component comprising the sacrificial material is present in the form of a rod, a strip, a plate, a sheet, a shim, a sphere, a cube, or combinations thereof.

11. The electrochemical cell of claim 1, wherein the component comprising the sacrificial metal is present in an irregular shape.

12. The electrochemical cell of claim 1, wherein the shim-structure includes a single-shim.

13. The electrochemical cell of claim 1, wherein the shim structure comprises multiple shims.

14. The electrochemical cell of claim 1, wherein the shim-structure has a shape that substantially conforms to the anode surface of the separator.

15. The electrochemical cell of claim 1, wherein the separator has a height dimension generally perpendicular to a base of the housing, and the shim-structure extends to the full height of the separator.

16. The electrochemical cell of claim 1, wherein the component comprises zinc or a zinc-containing ahoy.

17. The electrochemical cell of claim 1, wherein the component comprises copper or a copper-containing alloy.

18. The electrochemical cell of claim 1, wherein the component comprises brass.

19. The electrochemical cell of claim 1, wherein the sacrificial metal is included in a coating that at least partially covers the component.

20. An electrochemical cell, comprising:
    a housing having an interior surface defining a volume; and comprising iron;
    a tubular ion-conducting separator disposed in the volume, and having an anode surface defining a portion of an anode compartment containing an alkali metal, the alkali metal selected from the group consisting of lithium, sodium, and potassium; and
    a shim structure disposed within the anode compartment, generally adjacent and parallel to the anode surface of the separator, wherein the shim structure comprises zinc and is a separate structure from the anode surface of the separator.

21. An energy storage device comprising: a plurality of the electrochemical cells of claim 20, wherein the cells are in thermal and electrical communication with one another.

* * * * *